Patented Aug. 2, 1932

1,869,494

UNITED STATES PATENT OFFICE

HANS OSBORG, OF FRANKFORT-ON-THE-MAIN, GERMANY

COMPOSITION CONTAINING LITHIUM AND SILICON AND PROCESSES OF PRODUCING SAME

No Drawing.    Application filed July 8, 1930. Serial No. 466,584.

The present invention relates to compositions containing lithium and silicon and to a process of producing compositions containing lithium and silicon in a relatively stable form which can be used industrially for various purposes.

It is an object of the invention to provide a method by which compositions containing silicon and lithium can be made in a simple, practical and satisfactory manner on a commercial scale.

It is a further object of the invention to provide compositions containing lithium and silicon which are non-deliquescent and which are unaffected by oxygen or nitrogen in dry air at room temperatures.

Another object of the invention is to provide a method of producing compositions containing lithium and silicon which contains lithium and silicon in amounts proportional to the amounts of lithium and silicon used in the reacting mixture.

It is also within the contemplation of the invention to provide relatively stable and highly reactive compositions containing lithium and silicon which can be used industrially for various useful purposes.

Other objects and advantages of the invention will become apparent from the following description:

Broadly stated, my invention comprises heating a mixture of lithium and silicon at a temperature lying within a range from about 400° C. to 700° C. in a chamber under a high or practically absolute vacuum or in an inert atmosphere of rare gas or its equivalent. When a mixture of lithium and silicon is treated by my method, I obtain several different compositions which depends upon the amount of lithium and silicon used in the reacting mixture. One type consists of a multiplicity of substantially uniform, dark silvery gray crystals. A second type consists of blue orchid masses in the form of plates somewhat resembling slate.

A third type of crystals are light gray in color which appear to carry free lithium. This lithium seems to be the amount in excess of that needed to form the composition of silicon and lithium. These aforesaid crystals changed from their original color to a purplish blue on the edge portions thereof upon exposure to the atmosphere. Usually this color change occurs after an exposure to the atmosphere of about two to three seconds.

Lithium-silicon compositions of the first type are hard and brittle and have a metallic luster. The outer surface or skins of these compositions take on a coat of decomposition products, mostly carbonates and nitrides, which protect the interior thereof. Compositions of the second and third types are friable, fall to a powder in the air and react violently with water.

Upon subjecting the aforesaid crystals to analysis, it was found that silicon and lithium contents were as follows:

Specimens of Type I 1. 40–42% Li _____ 58–60% Si
2. 50–53% Li _____ 47–49% Si
3. 60–62% Li _____ 38–40% Si Specimens of Type II 4. 8–9% Li _____ 90–92% Si Specimens of Type III 5. 90% Li _____ 10% Si The amounts of raw materials used as ingredients in the production of the aforesaid alloys are as follows:

Ingredients for Type I compositions 1. 43% Li _____ 57% Si
2. 53% Li _____ 47% Si
3. 60% Li _____ 40% Si Ingredients for Type II compositions 4. 10% Li _____ 90% Si Ingredients for Type III compositions 5. 90% Li _____ 10% Si It will be observed that the percentage of each component present in the finished alloy is practically directly proportionally to the percentage of the component present in the reacting ingredients.

The following examples are given for purposes of illustration and a better understanding of my invention.

Example No. 1

A mixture containing about 53 parts lithium and about 47 parts of silicon are heated in an appropriate crucible to a temperature of about 600° C. The heating is carried on under a vacuum which is preferably practically complete. After the lithium is fused and the reaction temperature is reached, the lithium and silicon combine with each other and form a fused mass. Upon cooling, in the fused mass a solid body of substantially uniform dark silvery gray crystals can be observed. These crystals change from a silvery gray color to a purplish blue color on the edge portions thereof when exposed to the atmosphere for a relatively short period, say about five to ten seconds. An analysis of a composition made in accordance showed that silicon was present to the extent of about 47% and lithium was present to the extent of about 53%. After the initial color change, it was found that the crystals were non-deliquescent and could be handled in dry air. In practice, it is preferred to keep the crystals in a vacuum disiccator.

Example No. 2

A mixture of about 20.8 parts of lithium and about 28.3 parts of silicon is heated in a crucible to a temperature of about 600° C. under practically a complete vacuum. After thoroughly reacting and fusing, the entire mass is permitted to solidify. The solidified body thus produced is dark gray in color on the outside and silvery gray on the inside and is constituted of a mass of small crystals. An analysis of the mass of the crystals made according to the foregoing method, showed that silicon was present to the extent of about 58-60% and lithium was present to the extent of about 40-42%. The crystals acted the same as the crystals produced in Example No. 1.

Example No. 3

A mixture of about 41.6 parts of lithium and about 28.0 parts of silicon are heated in a crucible to a temperature of about 600° C. The heating is carried on under a practically complete vacuum. A product in accordance with the foregoing has a slivery gray color which becomes discolored upon exposure to the air. A mass made by the foregoing method was found to contain about 40% silicon and about 60% lithium. The crystals in said mass acted the same as noted in connection with Example No. 1.

In the foregoing examples I have specified that the heating is in a vacuum but the invention is not limited to this mode of procedure. Other appropriate procedures can be employed. For instance, instead of employing a vacuum, I may heat the lithium and silicon in an atmosphere of inert gas or gases such as rare gases like helium. Instead of rare gases, an atmosphere of lithium or silicon or a mixture thereof may be employed. A lithium atmosphere, however, is rather costly and I recommend preferably heating the mixture of lithium and silicon under a practically complete vacuum.

I have found that I can also produce my new composition of matter by reacting lithium and silicon in the vapor phase at an elevated temperature and by condensing the product of a reaction in any suitable manner as by cooling. This process is carried on to the exclusion of air and is preferably conducted under a high vacuum. When thus conducted, the condensed product has practically the same composition and properties as noted hereinabove in connection with the illustrative examples.

In some instances, I have found it desirable to use a compound of silicon, such as iron silicide, copper silicide or the like instead of silicon. For instance by heating a mixture containing about 50 parts of lithium and 50 parts of iron silicide containing about 80% silicon in a crucible to a temperature of about 600° C. under a high vacuum, I have been able to obtain a relatively stable composition of lithium and silicon. The product of the aforesaid reaction has a gray color and becomes discolored upon exposure to the atmosphere. The lithium composition sinks to the lower portion of the crucible whereas iron dust and the like floats on the top of the lithium-silicon layer. An analysis of the product showed that silicon was present to the extent of about 51.5%, lithium was present to the extent of about 41.9% and iron constituted approximately the balance.

In practice I have found it desirable to add an excess of iron silicide so as to embed the lithium-silicon composition in a shell of iron silicide or to distribute the lithium-silicon composition in a mass of iron silicide. Instead of using an excess of iron silicide, an excess of silicon can be used in the foregoing examples and the lithium-silicon composition will then be embedded in a shell of silicon. In other instances copper silicide can be employed instead of iron silicide.

The foregoing mixtures of lithium silicide and iron silicide are useful in the iron industry whereas the foregoing mixtures of lithium silicide and copper silicide are useful in the copper industry.

In some cases, a lower percentage or amount of silicon may be employed so as to embed the lithium-silicon composition in lithium.

What is claimed is:

1. The method of producing a composition containing lithium and silicon which comprises heating a mixture of lithium and silicon at a relatively elevated temperature in excess of about 500° C. in a substantially inert atmosphere to produce a non-deliquescent composition stable at high temperatures in excess of about 600° C. and containing lithium and silicon in amounts proportional to the reacting ingredients.

2. The method of producing a composition containing lithium and silicon which comprises heating a mixture of lithium and silicon together at a temperature lying within a range of about 500° C. to 700° C. in an inert atmosphere to produce a composition stable at high temperatures in excess of about 600° C. and containing lithium and silicon in practically constant amounts, the said amounts being approximately 40 to 60% for lithium and approximating 60–40% for silicon.

3. The method of producing a composition containing lithium and silicon which comprises heating a mixture of lithium and silicon at a temperature in excess of about 500° C. and up to or about 700° C. under a high vacuum to produce a composition stable at high temperatures in excess of about 600° C. and containing lithium and silicon in approximately constant proportions.

4. The process set forth in claim 2 in which an excess amount of silicon-bearing material is present in the reacting mixture so that the lithium-silicon composition produced by the reaction will be embedded in a shell of silicon-bearing material.

5. The process set forth in claim 2 in which an excess of silicide is present in the reacting mixture so as to embed the lithium-silicon composition produced by the reaction in a shell containing silicide.

6. The process set forth in claim 2 in which an excess of copper silicide is present in the reacting mixture so as to encase the lithium-silicon composition in a shell of copper silicide.

7. The process set forth in claim 2 in which an excess of iron silicide is present in the reacting mixture so as to encase the lithium-silicon composition in a shell of iron silicide.

8. The process set forth in claim 2 in which an excess of lithium is present in the reacting mixture so as to encase the lithium-silicon composition in a shell of lithium.

9. The process set forth in claim 2 in which lithium and silicon are reacted in the vapor phase and the lithium-silicon composition is obtained by condensation of the reaction products.

In testimony whereof I have hereunto set my hand.

HANS OSBORG.